US008988447B2

(12) United States Patent
McKellar

(10) Patent No.: US 8,988,447 B2
(45) Date of Patent: *Mar. 24, 2015

(54) TEXTURING 3-DIMENSIONAL COMPUTER GRAPHIC IMAGES

(71) Applicant: Imagination Technologies Limited, Kings Langley (GB)

(72) Inventor: Colin McKellar, Herts (GB)

(73) Assignee: Imagination Technologies, Limited, King Langley, Hertfordshire (GB)

(*) Notice: Subject to any disclaimer, the term of this patent is extended or adjusted under 35 U.S.C. 154(b) by 0 days.

This patent is subject to a terminal disclaimer.

(21) Appl. No.: 14/052,966

(22) Filed: Oct. 14, 2013

(65) Prior Publication Data

US 2014/0139527 A1    May 22, 2014

Related U.S. Application Data

(63) Continuation of application No. 10/564,306, filed as application No. PCT/GB2004/002593 on Jun. 16, 2004, now Pat. No. 8,564,606.

(30) Foreign Application Priority Data

Jun. 17, 2003 (GB) .................................. 03140316
Jun. 16, 2004 (WO) ................ PCT/GB2004/002593

(51) Int. Cl.
G09G 5/00 (2006.01)
G06T 5/00 (2006.01)
G06T 15/04 (2011.01)

(52) U.S. Cl.
CPC . *G06T 5/00* (2013.01); *G06T 15/04* (2013.01); *G06T 2200/28* (2013.01)
USPC ........................................................ 345/587

(58) Field of Classification Search
CPC ... G06T 15/04; G06T 11/001; G06T 2210/36; G06T 15/503; G09G 2360/122
USPC ........................................ 345/522, 587, 428
See application file for complete search history.

(56) References Cited

U.S. PATENT DOCUMENTS 6,304,268 B1 * 10/2001 Iourcha et al. ................ 345/428
6,593,929 B2 * 7/2003 Van Hook et al. ............ 345/501
6,747,649 B1 * 6/2004 Sanz-Pastor et al. ......... 345/428

* cited by examiner

*Primary Examiner* — Hau Nguyen
(74) *Attorney, Agent, or Firm* — Michael S. Garrabrants

(57) ABSTRACT

A method and apparatus are provided to generate automatically a mip-map chain of texture images from a portion of texture image data such that it may be used in texturing a computer graphic image. A portion of the texture image data is stored temporarily and is filtered to generate at least one lower level of mip-map data from the texture data. This lower level of mip-map texture image data is then stored for use in texturing. Preferably these are stored on a tile-by-tile basis where a tile is a rectangular area of the image being displayed.

7 Claims, 4 Drawing Sheets

128x128        64x64        32x32    Etc.

TEXTURING 3-DIMENSIONAL COMPUTER GRAPHIC IMAGES

CROSS REFERENCE TO RELATED APPLICATIONS

This application is a continuation of U.S. application Ser. No. 10/564,306, filed on May 15, 2006, which is a national stage entry of PCT/GB2004/002593, filed on Jun. 16, 2004, which claims priority from GB0314031.6, filed on Jun. 17, 2003.

BACKGROUND

This invention relates to the texturing of 3-dimensional computer graphic images and in particular to a technique in which a mipmap chain of texture images is automatically generated during the process of texturing an image.

Texture mapping is a well-known technique in computer graphics and is used to apply bitmaps of texture image to objects being shaded to increase the realism of their representation. The texture images are bitmaps which are stored in memory.

During rendering of an image, if textures are sampled only one per screen pixel, aliasing will become a significant problem. FIG. 1 shows a texture receding into the distance with a single texture sample per pixel. As can be seen, the smaller samples start to show visible aliasing artefacts.

Mipmappinq is a known technique which is used to reduce the aliasing artefacts in texture mapping. Essentially, mipmapping involves storing filtered versions of the source data being represented, at different view points. These view points typically represent different distances to the object. Thus, a typical mipmap would consist of the original texture plus further copies at ½, ¼, ⅛, etc. resolutions. To produce these lower resolutions, each pixel is a filtered average value of e.g. four pixels from the next highest resolution mipmap. Pre and post filtering of the texture can further improve the quality of the rendered image by further reducing aliasing and ringing artefacts.

When mipmaps and texture maps are stored in memory, it is known to use a method called twiddling to ensure that spatially related data is stored together. This can greatly improve memory bandwidth utilisation by reducing the number of page breaks within a read of a portion of e.g. texture data. Further memory bandwidth requirements can be obtained by using systems known as tile based rendering systems. This is a technique in which an image to be rendered is broken down into a set of smaller rectangular areas or tiles. Each tile is processed individually for the objects which may be visible within it thereby reducing memory bandwidth requirements and therefore the size of any internal storage buffers. Lighting and reflections may be applied to rendered 3D objects by using a technique known as cubic environment mapping. This operates by, for example, first rendering a scene as it would be seen if looking outwards from the face of an object into an environment map texture. This texture is then mapped onto the face of the object.

Cubic environment maps which are sometimes referred to as cubic maps, are textures that contain image data representing scenes surrounding an object, as if the object were in the centre of cube. Each face of the cubic environment map covers a 90° field of view in the horizontal and vertical and there are six faces per cube map. Each face is perpendicular to the X/Y, Y/Z, or X/Z plane in 3D space. These maps are implemented as a series of texture objects. Applications can use static images for cubic environment mapping or they can render into the faces of the cube map to perform dynamic environment mapping.

SUMMARY OF THE INVENTION

Preferred embodiments of the present invention provide a technique in which a mipmap chain is automatically created from a texture map. In known immediate mode rendering devices (IMR) this effect would typically be achieved by first reading a top level mipmap and then producing a scaled down version of the mipmap level and repeating this process until all map levels have been generated. This is typically accomplished either using existing 3D graphics hardware pipeline or using a piece of dedicated scaling hardware. This has the disadvantage of consuming rasterisation time if the 3D hardware is used or additional read and write bandwidth from external memory if additional hardware is used.

The ability to create automatically mipmap data is particularly useful when dynamically created textures such as dynamic environment maps are being used. These by their very nature do not have a pre-generated mipmap chain available. Using known systems this is not possible unless rasterisation time is increased in the 3D hardware or additional read and write bandwidth from external memory is required if additional hardware is used.

We have appreciated that by utilising the internal storage of a tile based 3D graphics engine a number of mipmap levels can be generated for e.g. a dynamic environment texture map with no additional hardware passes. Any further mipmap levels that are subsequently required can then be generated at a fraction of the bandwidth cost associated with an IMR system.

Preferably, in a tile based 3D graphics engine a memory buffer known as the tile buffer is used for temporary storage of mipmap levels as they are generated. In normal usage the tile buffer is used to store a rectangular portion of the image being rendered.

Preferred embodiments of the invention can also be used to generate mipmaps for data supplied from other sources such as video streams and user supplied bitmaps. In the latter case, mipmap generation can be performed during the process of copying data from a direct memory access (DMA) buffer to a frame store, thereby saving an additional copy of the data from host to frame buffer memory.

Embodiments of the invention also seek to improve the visual quality of the supplied data stream by allowing filtering to be performed pre and post mipmap generation.

The invention is defined in its various aspects in the appended claims to which reference should now be made.

BRIEF DESCRIPTION OF THE DRAWINGS

A preferred embodiment of the invention will now be described in detail by way of example with reference to the accompanying drawings in which.

DETAILED DESCRIPTION OF PREFERRED EMBODIMENT

The embodiment now described enables mipmap chains to be generated dynamically, substantially in real time, with less intervention by any driver or application software than has previously been the case. This is achieved by using dedicated hardware for the dynamic mipmap generation, which is faster than traditional methods for performing this task in software and also minimises additional bandwidth requirements or hardware contention issues exhibited by existing hardware.

Figure 1:
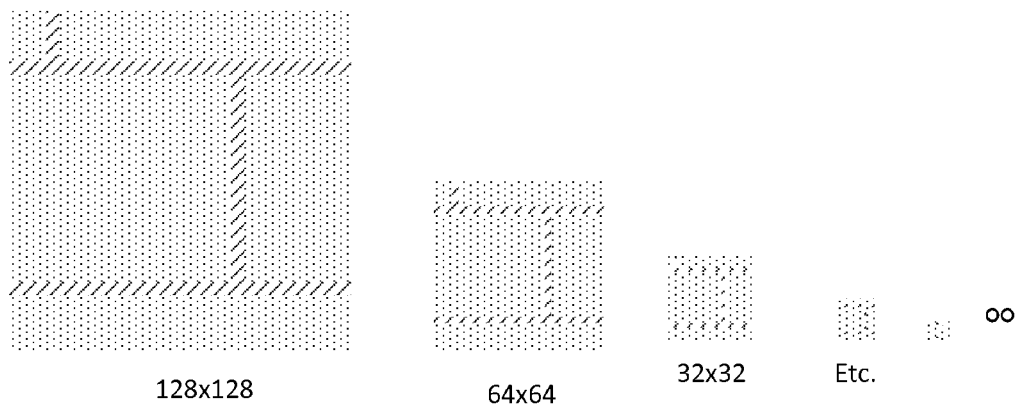
FIG. 1 shows a sample of texture data receding into the distance as discussed above.
Figure 2:
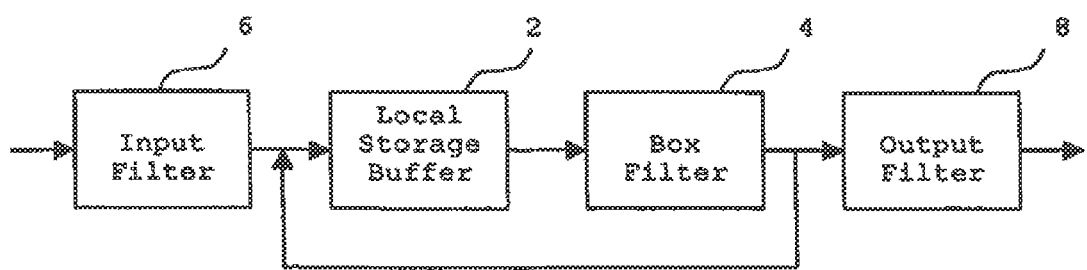
FIG. 2 shows a block diagram of the hardware required to implement the present invention.

FIG. 2 shows schematically the hardware required to dynamically generate mipmap chains. Primarily, this comprises a local storage buffer 2 and a box filter 4 to create a filtered output of input data for the generation of lower level mipmaps.

The input data stream is stored in the local storage buffer 2 and a copy is written to the main texture memory (not shown). The data from the local storage buffer is then filtered to half is original dimensions in the X and Y directions, and thus to half its resolution and via a feedback loop is stored back into the local storage buffer 2 as well as being output to the main external texture memory. This operation is repeated until all the required mipmap levels have been generated and stored into the main texture memory.

A counter is employed on the feedback loop to ensure that the correct number of levels of mipmap data are generated.

The local storage buffer can be large enough to store all the different mipmap levels at different storage locations. Alternatively, it can be small in size and data can be overwritten as each mipmap level is generated.

Its minimum size will be the size of the highest level mipmap.

For original texture image data which is large at the highest mipmap level, performance can be improved by breaking this down into smaller more manageable chunks of data, in a similar manner to that used in tile base rendering, and by processing each of these tiles individually. This reduces the amount of storage required to perform the operation. For example, a larger rectangular mipmap may initially be broken down into four smaller rectangular chunks and each of these is then processed individually. If this is done, then preferably each of the four chunks is stored in a known location at each mipmap level. When a mipmap is retrieved for texturing purposes all four portions of the required level are retrieved and are recombined to produce the complete mipmap level.

Figure 3:
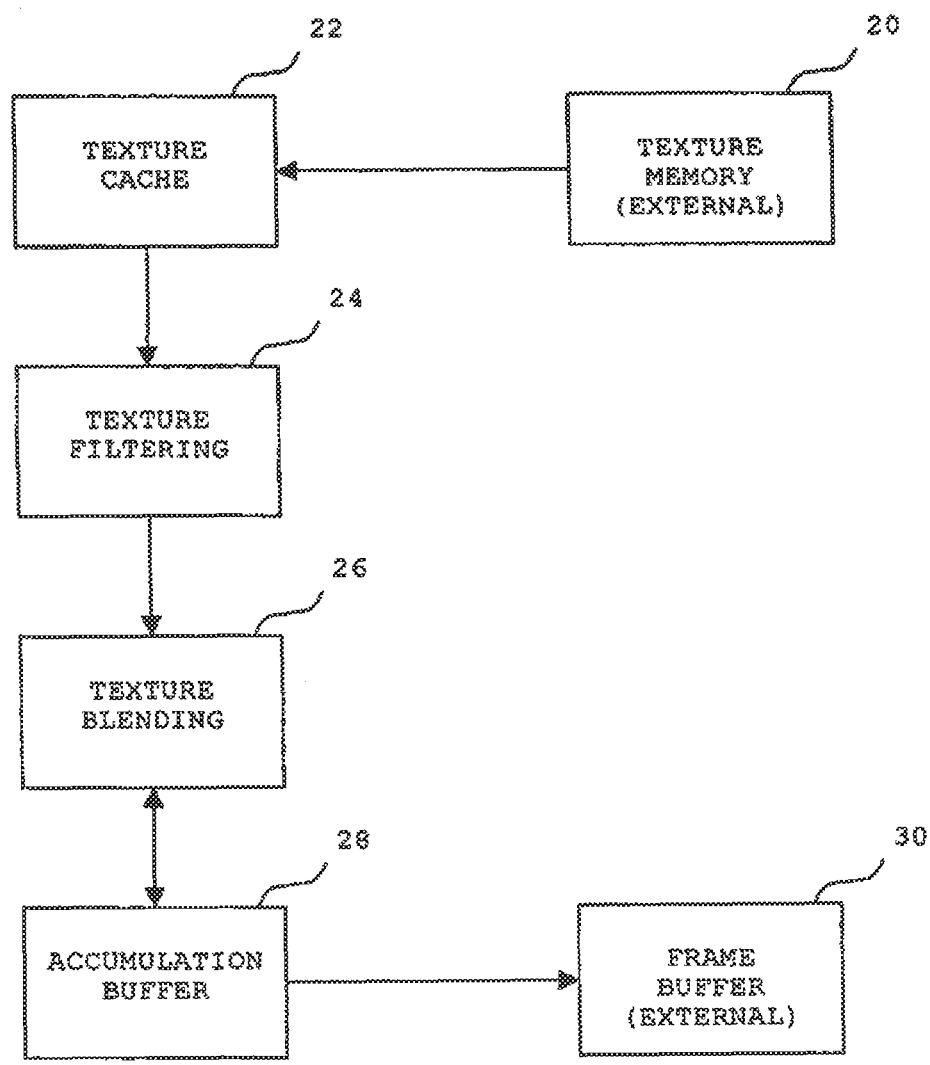
FIG. 3 shows a block diagram of a known texture processing unit.

The arrangement of FIG. 3 also shows an input filter 6 with an output filter 8. These can be selectively activated. The additional pre and post filtering allows a user to improve the quality of the data.

In this particular example a simple box (averaging) filter is used. This could, however, be replaced with a more complicated filter type. The purpose of the pre-post filter in this example is to improve the quality of the mipmap image by anti-aliasing the data. This is particularly useful for video data sources as they are generally supplied without mipmaps and due to the nature of such sources have not been filtered before they are supplied to a graphics application. If they are used in the form in which they are supplied they are susceptible to banding and ringing artefacts.

In one example of dynamic mipmap generation, input texture data is provided as an image which is 1024×1024 pixels in size. This represents the top image in a mipmap chain. This is then broken down into tiles each with the measurements of 32×32 pixels. Each tile is filtered before it is stored into the local buffer to improve the quality of the data. For example, if the input data is a video image it can be low pass filtered to improve the visible aliasing present in the source image.

For each tile in turn, the 32×32 portion of image data (Mipmap A) stored in the location storage buffer 2 is filtered by the box filter into a 16×16 image (Mipmap B) and the results stored back into the relevant storage buffer 2 as well as being written to external memory. This is followed by a further filtering of the 16×16 image into an 8×8 image. The process repeats until the image is reduced to a 1×1 pixel map.

By performing mipmap generation on a tiled image as in this example, the storage capacity for the operation is reduced by a factor of 1024, since only one tile needs to be processed at a time, and thus the minimum size for the local storage buffer is 32×32 pixels.

Twiddled storage of texture reduces memory page breaks by grouping blocks adjacent to texels into physical blocks within the memory. A group of four texels is first organised to make 2×2 blocks. Four of these 2×2 blocks are then organised into a 4×4 block. Four of the 4×4 blocks are then organised into a 16×16 block and so on. This is achieved by bit interleaving the horizontal and vertical coordinates of the memory addresses. This process can be understood straightforwardly in the context of a tile based rendering 3D graphics engine. In such a system there is already in existence a storage buffer known as a tile buffer. This is used to store a rectangular tile of the rendered image as it is being rendered. Images rendered on a tile by tile basis in such systems to reduce the number of objects required to be considered for each pixel.

This tile buffer can be utilised as the local storage buffer 2 of FIG. 2 for the auto-generation of mipmaps. In a first pass the original image (up to one tile in size) is stored in this buffer. The box filter 2 then filters the image to ½ those dimensions and stores the result in the tile buffer. This takes up only ¼ of the buffer is the original data was one tile in size. The new data is then filtered again with the results being stored in the tile buffer now at ¹⁄₁₆ of the size of the original data. The process repeats until the final mipmap level (generally one pixel by one pixel) is generated. After each step, the mipmap level generation is stored temporarily in the tile buffer and then in the main system memory. Each subsequent mipmap level overwrites at least part of the previous level in the tile buffer.

Preferably data is stored in twiddled format. This then requires further filter inputs to be stored consecutively in the buffer, thereby simplifying the operation of reading the data and writing back the result.

In an alternative embodiment, the simple box filter could be replaced with a more complicated filter and a buffer larger than a tile size could be provided. This would allow more complex filtering image/data processing techniques to be performed, automatic edge detection, up-scaling and noise reduction techniques.

FIG. 3 shows the texturing part of a texture signal processing unit of the type which may used in an embodiment of the invention. In this, textures are read from a texture memory 20 into a texture cache 22. Any texture filtering required is then performed in a texture filtering unit 24 before the texture is blended with any existing data for the pixels to which it is being applied, which are stored in the accumulation buffer 28. The blending takes place in a texture blending unit 26. The accumulation buffer stores a rectangular tile of the image which is being textured. The image data associated with the tile have been previous derived before texturing. Once texturing has been performed the image data will be complete and the data can then be written to the frame buffer 30.

The texture memory 20 and the frame buffer memory 30 are typically both part of a main memory of the graphics system. This is large enough to store the frame buffer, and the textures required. In known systems, the textures are stored in mipmap form going from highest to lowest resolution for each texture.

When the system is modified in the embodiment of the present invention the texture memory need only store the highest resolution version of each texture. Then, when the image data for a tile is known, the system can be arranged to generate the lower level resolution mipmaps required to perform full texturing. This is achieved by passing the high resolution mipmap directly to a modified accumulation buffer where the generation of lower level resolution mipmaps will be performed.

Figure 4:
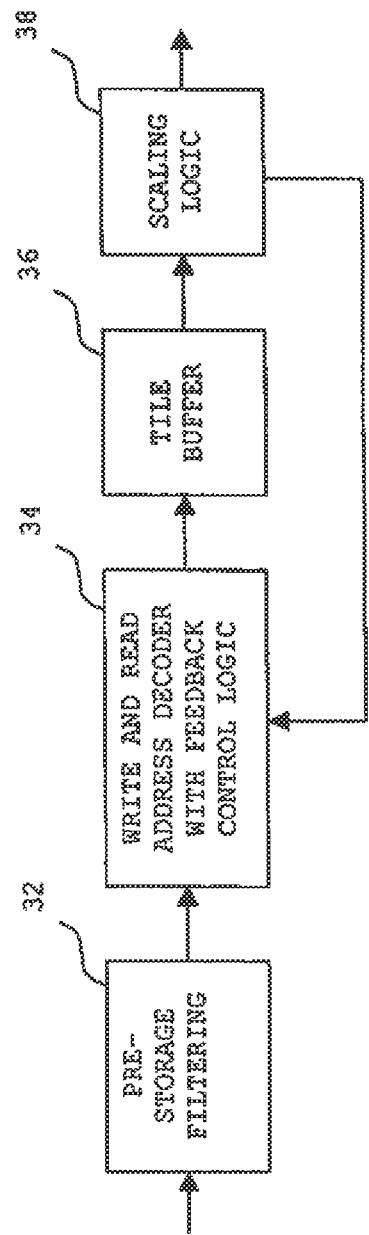
FIG. 4 shows a modification to the accumulation buffer of FIG. 3 embodying the invention.

A modified accumulation buffer 28 is shown in FIG. 4. This comprises a pre-storage filtering unit which is arranged to perform any necessary pre-storage filtering on the high resolution mipmap. The high resolution mipmap is then received by a write and read address decoder unit 34. This decodes the addresses of the high resolution mipmap and supplies them to the tile buffer 36. From here, they can be read via the scaling logic 38 to an output which sends them to the external memory. This is the same output which is usually used to write data into the frame buffer. However, as the frame buffer is a partitioned portion of the main external memory the scaling logic can be modified to send them to a free area of that memory for temporary storage.

At the same time, the scaling logic performs a filtering operation on the texture data. This is then fed back using a feedback control logic portion of the write and read address decoder 34 into the tile buffer 36. This filtering operation generates a lower resolution mipmap typically at half the resolution of the original mipmap. This in turn is then read out via the scaling logic 38 to the external memory whilst at the same time a next lower level mipmap is generated by the scaling logic 38 and fed back to the tile buffer via the read and write address decoder at 34. This process continues until all the required levels of mipmap have been generated.

Alternatively, the scaling logic can be arranged such that on the first iteration it reads out the second lower resolution mipmap on the basis that the higher level resolution mipmap is already stored in texture memory and is thus available to the system. The second level is then stored in the tile buffer 36 and on the next iteration the third level is generated and read out to memory by the scaling logic 38.

Once texture mipmaps have been generated for all the textures required to texture a particular tile, these are then used by the texture signal processing unit of FIG. 3 to texture the surfaces visible in a particular tile using the arrangement of FIG. 3. The operation of this will be known to those skilled in the art.

It will thus be appreciated that it is not necessary to store permanently all the texture data to be applied in mipmap form. Instead, it is necessary only to store the highest resolution of each texture. Also, using such an arrangement gives the system the versatility to read in additional data to be used for texturing. This means that it is not necessary to have a large library of texture data, instead, each image or sequence of images being rendered can have its own library of texture data read into the system before rendering commences.

In a preferred embodiment, for an image or sequence of images to be rendered, all the texture mipmaps required for that image or sequence of images will be generated and stored in main memory prior to commencement of texturing of the whole image. Alternatively, this can be performed on a tile by tile basis.

I claim:

1. A computer graphics rendering system, comprising:
   a main memory hierarchy comprising a frame buffer portion for storing data for pixels of a rendered image;
   a hardware unit configured to
      derive image data associated with a tile of pixels of an image to be rendered;
      dynamically generate texels for a mipmap level of a tile of an environment map, wherein the tile is a subset of the environment map and is generated at a first resolution,
      store the tile of the environment map in a local buffer that is local to the hardware unit,
      access texels of the tile of the environment map from the local buffer, and
      generate one or more reduced-resolution versions of the accessed texels of the tile of the environment map,
      apply, within the hardware unit, the generated one or more reduced-resolution versions of the accessed texels in a texturing operation with the derived image data associated with the tile of pixels of the image to be rendered, and to
      output textured image data for storage in the main memory hierarchy.

2. The computer graphics rendering system of claim 1, wherein the main memory hierarchy comprises a texture cache and a main memory coupled with the texture cache.

3. The computer graphics rendering system of claim 1, wherein the hardware unit comprises a texture filter and a texture blender.

4. The computer graphics rendering system of claim 3, wherein the texture blender is configured to blend the generated one or more reduced resolution versions of the accessed texels with the derived image data, and the texture filter is configured to access the texels of the environment map from the local buffer and to generate the one or more reduced version of the accessed texels.

5. The computer graphics rendering system of claim 1, wherein the hardware unit is configured to generate a complete mipmap chain for the tile of the environment map prior to using any of the texels in the mipmap chain for texturing by the texturing unit.

6. A method to automatically generate texture data for use in texturing a computer graphics image comprising:
   producing a tile of image data to be textured, within a hardware unit of a tile-based graphics unit;
   storing the tile of image data in a local buffer of the tile-based graphics unit;
   dynamically generating texels of a tile of an environment map, the texels being from multiple mipmap levels of a full mipmap for the tile of the environment map;
   blending texels from the dynamically generated texels of the tile of the environment map, within a blending unit of the tile-based graphics unit;
   using the blended texels in a texturing operation for the produced tile of image data by a texturing part within the hardware unit, wherein the producing, storing, dynamically generating, blending and using of the blended texels are all performed without an additional hardware pass through the tile-based graphics unit; and
   outputting data, based on an output of the texturing operation, to a main memory hierarchy external to the tile-based graphics unit.

7. A method according to claim 6 in which dynamically generating comprises generating all mipmap levels for texels of the tile in the local buffer.

* * * * *